(No Model.)　　　　　　　　　　　　　　　8 Sheets—Sheet 1.
H. R. TOWNE.
CAR HEATING APPARATUS.

No. 398,472.　　　　　　　Patented Feb. 26, 1889.

WITNESSES:　　　　　　　　　　　　　　INVENTOR,
E. A. Newman　　　　　　　　　　　　Henry R. Towne,
C. M. Newman　　　　　　By his Attorneys
　　　　　　　　　　　Baldwin Hopkins + Peyton.

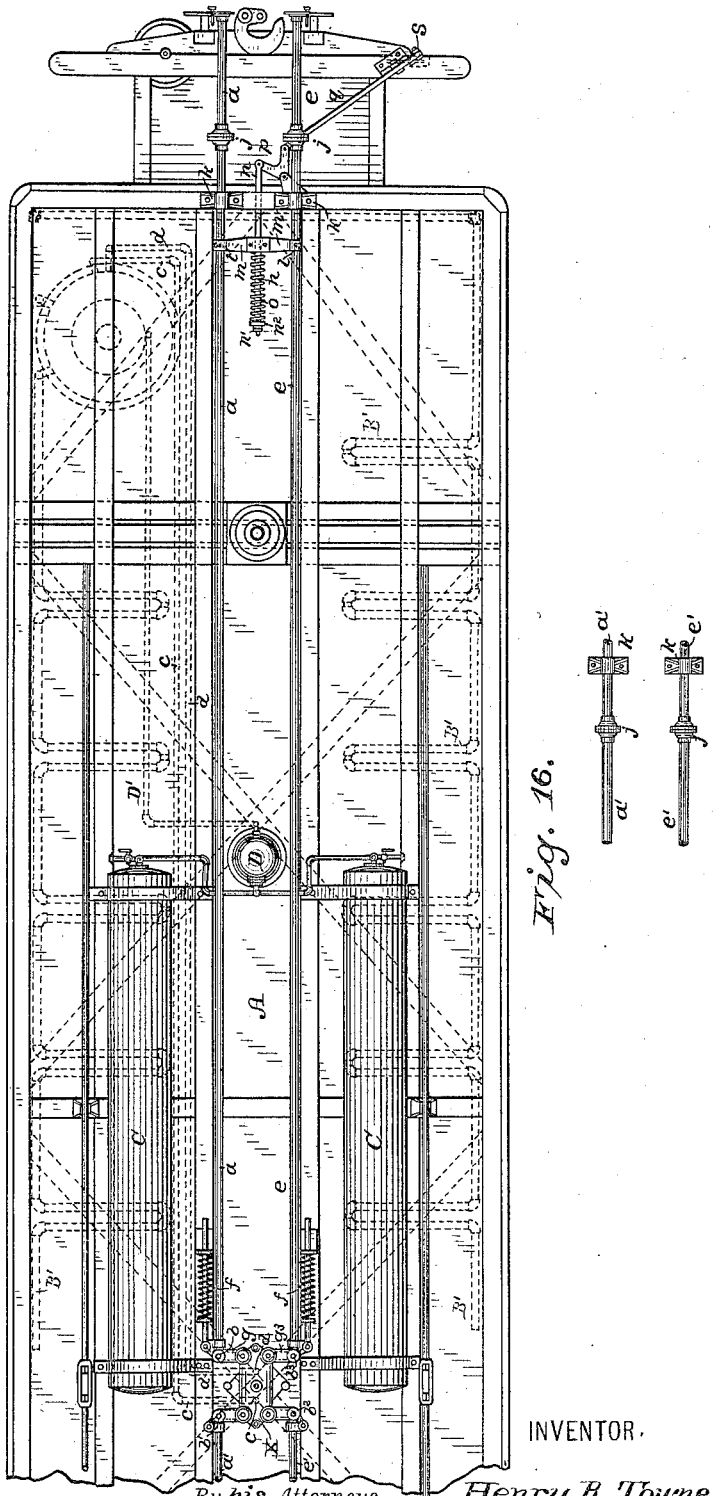

(No Model.) 8 Sheets—Sheet 3.
H. R. TOWNE.
CAR HEATING APPARATUS.
No. 398,472. Patented Feb. 26, 1889.
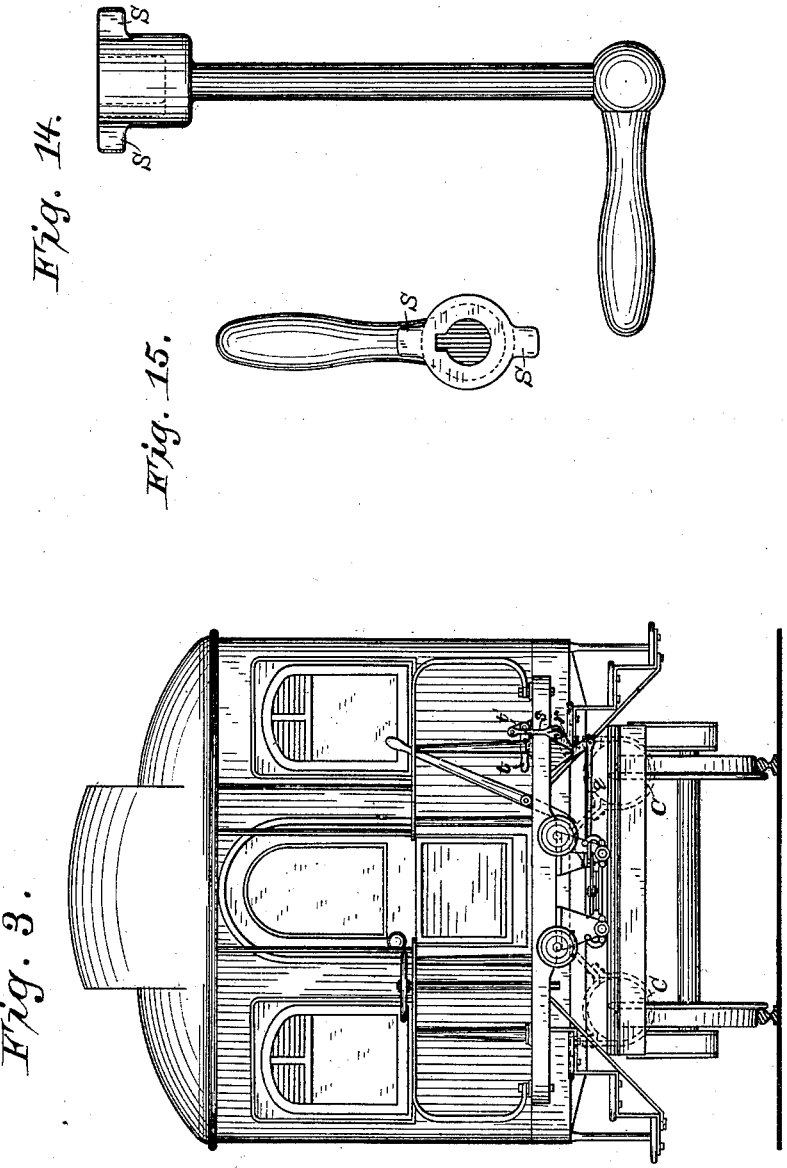
WITNESSES
E. A. Newman,
C. M. Newman,
INVENTOR,
Henry R. Towne,
By his Attorneys
Baldwin Hopkins & Peyton.

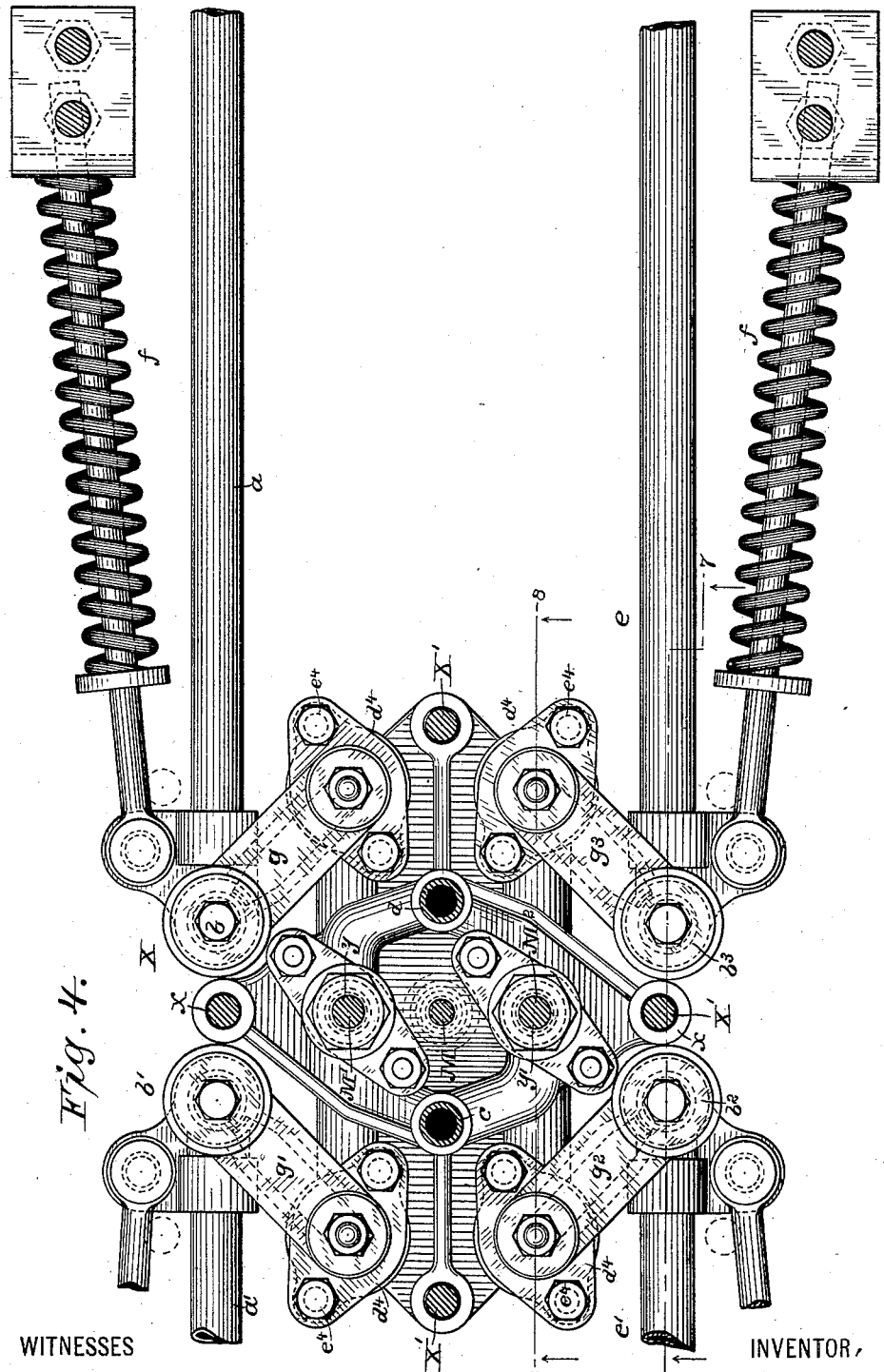

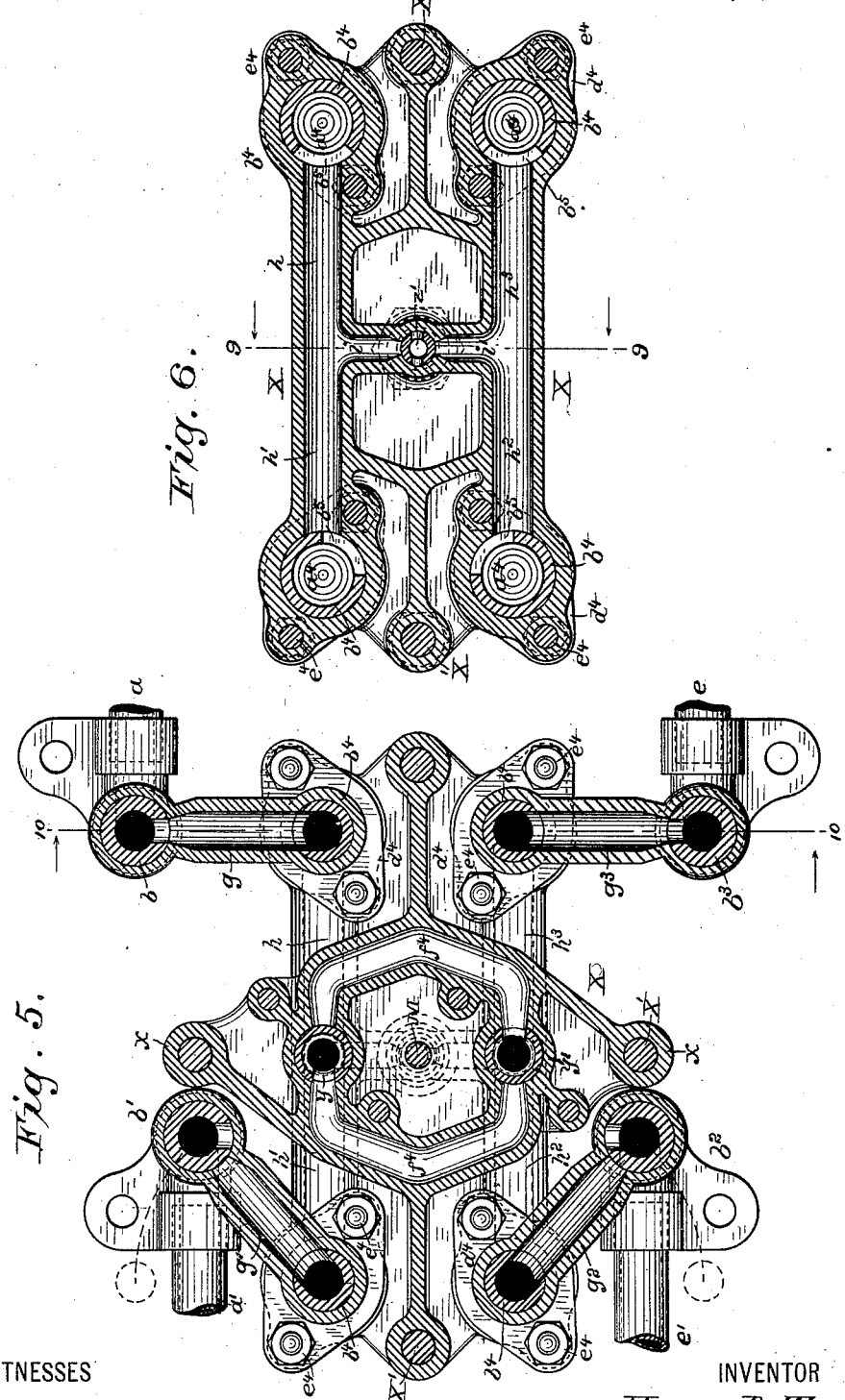

(No Model.) 8 Sheets—Sheet 6.
H. R. TOWNE.
CAR HEATING APPARATUS.
No. 398,472. Patented Feb. 26, 1889.
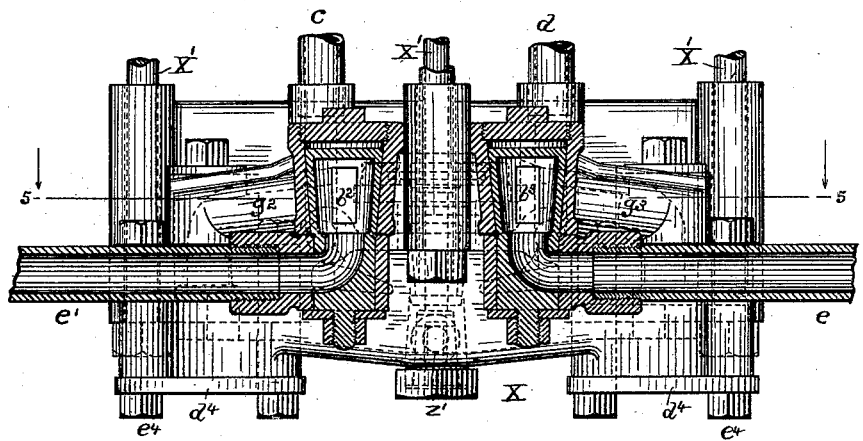
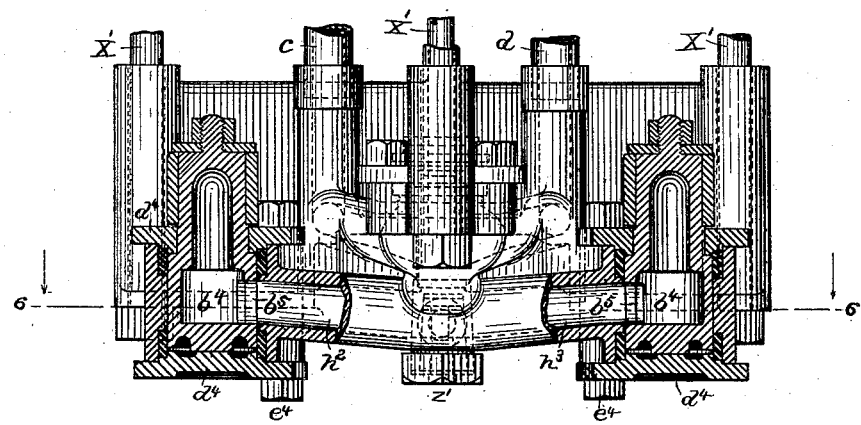
WITNESSES
E. A. Newman
C. M. Newman
INVENTOR
Henry R. Towne,
By his Attorneys
Baldwin Hopkins & Peyton.

(No Model.) 8 Sheets—Sheet 7.

H. R. TOWNE.
CAR HEATING APPARATUS.

No. 398,472. Patented Feb. 26, 1889.

WITNESSES
E. A. Newman
E. M. Newman.

INVENTOR,
Henry R. Towne,
By his Attorneys
Baldwin Hopkins & Peyton.

(No Model.) 8 Sheets—Sheet 8.
H. R. TOWNE.
CAR HEATING APPARATUS.
No. 398,472. Patented Feb. 26, 1889.
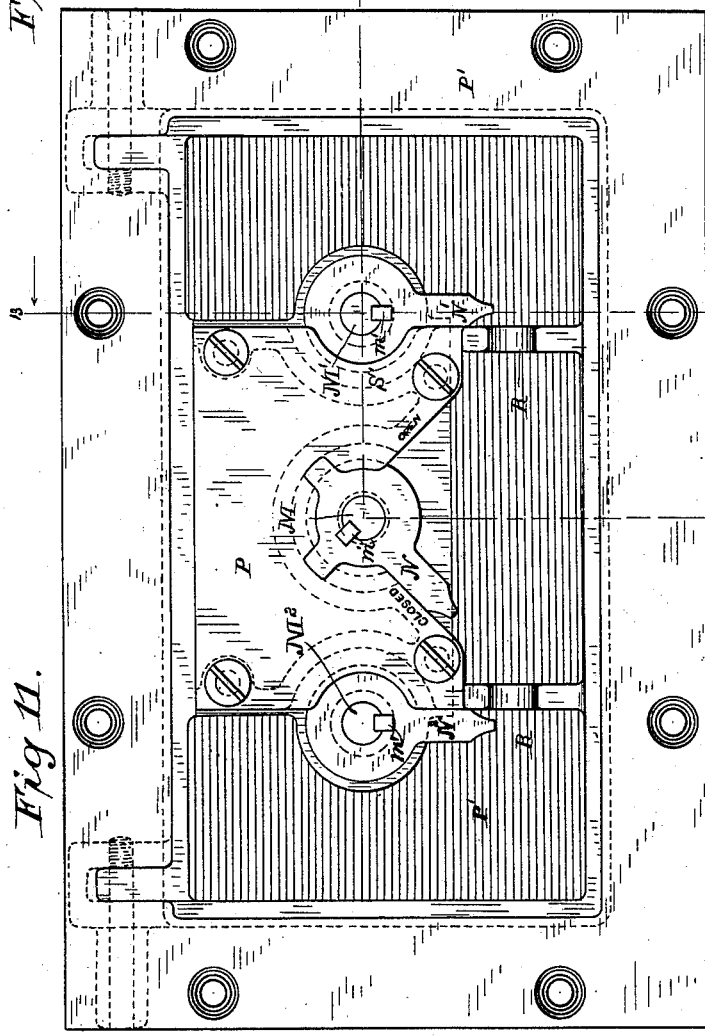
WITNESSES
E. A. Newman.
C. M. Newman.
INVENTOR·
Henry R. Towne,
By his Attorneys
Baldwin Hopkins & Peyton.

UNITED STATES PATENT OFFICE.

HENRY R. TOWNE, OF STAMFORD, CONNECTICUT, ASSIGNOR TO THE SAFETY CAR HEATING AND LIGHTING COMPANY, OF NEW JERSEY.

CAR-HEATING APPARATUS.

SPECIFICATION forming part of Letters Patent No. 398,472, dated February 26, 1889.

Application filed May 18, 1887. Serial No. 238,670. (No model.)

*To all whom it may concern:*

Be it known that I, HENRY R. TOWNE, of Stamford, in the county of Fairfield and State of Connecticut, have invented certain new and useful Improvements in Car-Heating Apparatus, of which the following is a specification, reference being had to the accompanying drawings, in which—

Figure 1:
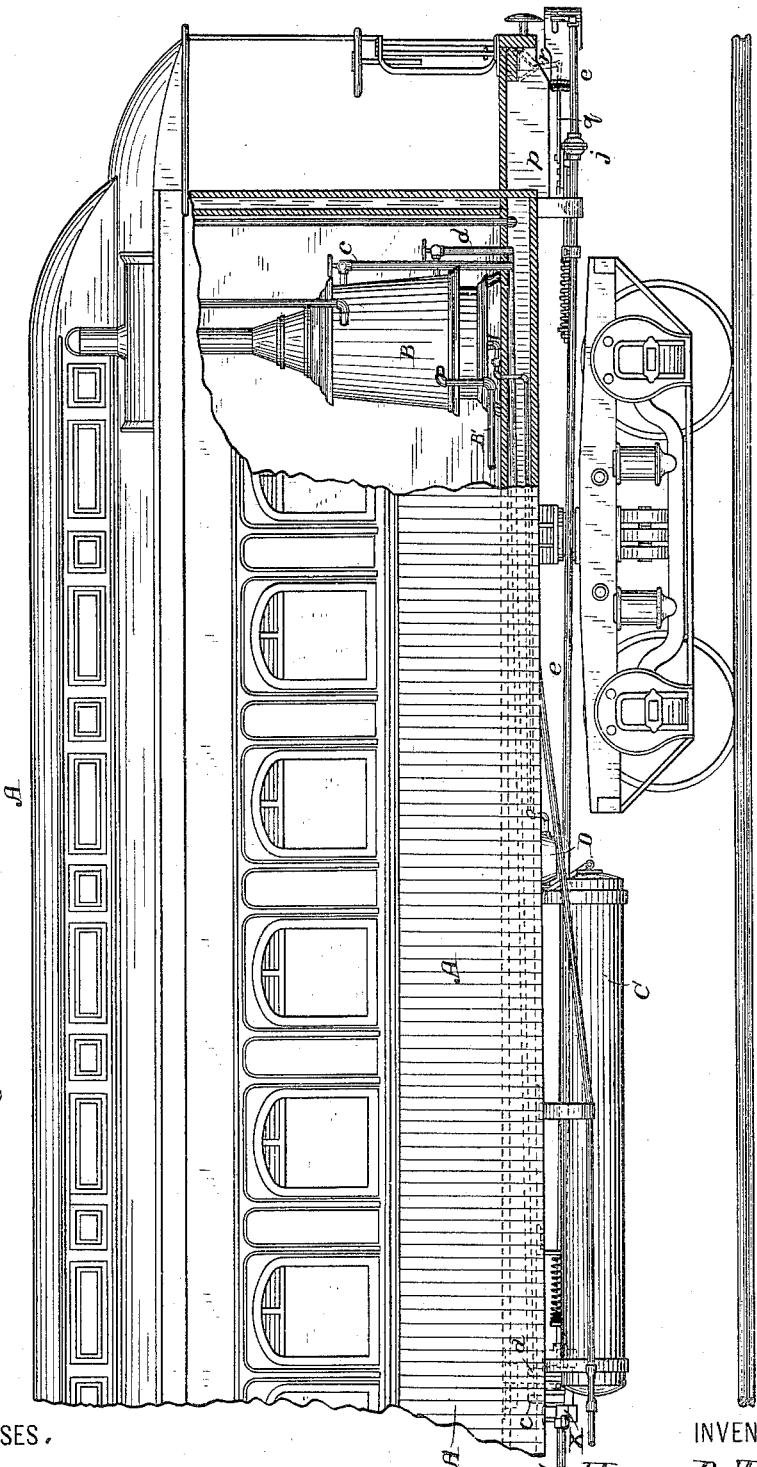
Figure 9:
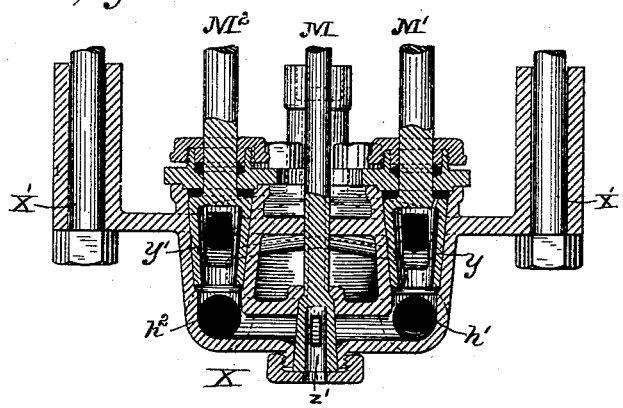
Figure 10:
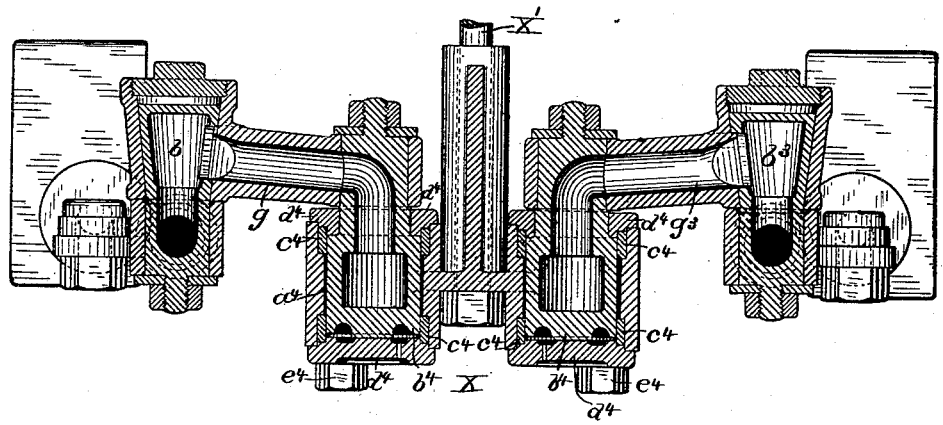

Figure 1 is a side elevation, partly in section, of a part of a car provided with my improved apparatus. Fig. 2 is a bottom plan view of the same. Fig. 3 is an end elevation of the same. Fig. 4 is a view of the center-fitting with pipes and connections upon an enlarged scale, partly in section. Fig. 5 is a view of the same, taken on the line 5 5 of Fig. 7. Fig. 6 is another view of the same, taken on line 6 6 of Fig. 8. Fig. 7 is a view of the same, taken on line 7 7 of Fig. 4. Fig. 8 is a view of the same, taken on the line 8 8 of Fig. 4. Fig. 9 is a view of the same, taken on the line 9 9 of Fig. 6. Fig. 10 is a view of the same, taken on the line 10 10 of Fig. 5. Fig. 11 is a plan view, on an enlarged scale, of indicating mechanism in a box, the lid being off. Fig. 12 is a view of the same, partly in section, on the line 12 12 of Fig. 11. Fig. 13 is a view of the same on the line 13 13 of Fig. 11. Fig. 14 is a view of a key for operating the indicator shown in Fig. 11. Fig. 15 is a bottom plan view of the key. Fig. 16 shows a small section of the steam-pipes as they would be at the opposite end of the car shown in Fig. 2. Fig. 17 is a diagrammatical view indicating the gear-connection between valve-stems.

In Fig. 2 the movable parts on the center-fitting are all shown in the position they will occupy when the car is coupled at both ends. In Fig. 4 these parts are shown in the position they would assume in a detached car, and in Fig. 5 they are in the position they would assume with one end of a car coupled, the car being the last of a train.

My improvements relate to the operative details and mechanism of a car-heating system, in which the heating medium—preferably steam—supplied from a prime heater—such as a locomotive—is conveyed in pipes to the respective cars of a train, and is utilized in each of said cars for heating by direct circulation and radiation of the heating medium in the local circulating-pipes of the car, or is utilized for heating water or any other suitable local circulating medium by transferring its heat thereto in a transfer-chamber or otherwise, said local circulating medium being then utilized for distributing its heat properly throughout the car in any desired way.

The general plan of my present improvements consists in providing two parallel lines of pipes extending from the locomotive throughout the length of the train of cars to be heated, one of these lines serving as the steam-supply pipe and the other the exhaust or return-water pipe; also, in providing at or near the middle of each car a device that I term a "center-fitting," which contains provision for making proper connection between the two adjoining lengths of each line of pipe, so as to establish a continuous circulation through them when two or more cars are connected, and provision for automatically closing such connection at the center of any car which is not coupled to another car behind it, and provision for establishing a connection between the steam-supply pipe and the inlet end of the local heater or circulating system in the car and a similar connection between the other end or outlet of such system and the return or condensed-water line of pipes, and provision for the proper drainage of the water of condensation, both from itself and from the pipes connected with it, whether the car is coupled to others and the heating system in operation or is detached and the system out of service; also, in providing means for closing the circuit at the rear car of a train and affording means whereby the steam-supply of each car may be regulated independently; also, in providing for the thorough drainage, by gravity, of all water of condensation when the cars are disconnected and the heating system disused, (thus protecting it against damage by freezing;) also, in providing convenient means for quickly and safely coupling the two lines of pipe on each car with the two similar lines on each adjoining car in making up a train.

As illustrated in the drawings, my present improvements are shown in connection with a system of car-heating by means of a local heater and transfer-chamber in each car, which arrangement is the subject of another application by me for Letters Patent No. 226,569, filed February 4, 1887. The drawings also illustrate an arrangement of gas-tanks, C, and gas-mixer D for supplying gas fuel by means of pipe D' to the local heater in each car. This device, however, being incorporated in the prior application above referred to and forming no part of the present improvements, is only illustrated to show the utility of my present improvements in connection with a complete modern safety heating outfit for cars.

Referring to the drawings, the arrangement and operation of my improvements will be readily understood from the following description.

In Fig. 1 is shown a car-body, A, containing a combined local heater and transfer-chamber, B, adapted to receive steam from a locomotive. (Not illustrated.) B' indicates local circulation-pipes in a car, as usual. I will suppose that steam from a prime heater on the left is conveyed through the pipe $e'$, as shown in Figs. 1 and 2. The rear end of this pipe is shown as attached to the arm $g^2$ of the center-fitting X. (Shown more plainly in Figs. 4 to 10.) In like manner the pipe $a'$, parallel to pipe $e'$, (see Figs. 1, 2, and 4,) is connected to a corresponding arm, $g'$, of the center-fitting, and of course in practice would extend forward to the prime heater or locomotive, thus serving as a conduit for the return of the water of condensation. Referring to Fig. 2, it will thus be seen that the system provides for taking steam from a locomotive (not illustrated) to one side of the center-fitting X and for returning the water of condensation from the opposite side of the center-fitting to the locomotive.

Referring now to Figs. 4 to 10, showing the center-fitting in detail, its construction and operation may be described as follows: It consists of a casting, X, securely attached to the floor of a car, preferably underneath, and containing, as seen in Fig. 6, four chambers or seats, $a^4$, for rotating pivot-pins or plugs $b^4$. Fig. 10 is a transverse section through the center of two of these plugs, and shows them, as I prefer to make them, with parallel seats, and packed, to prevent leakage at the top and bottom, with a ring of asbestus or other packing, $c^4$, held in place by proper caps, $d^4$, and bolts $e^4$. A port, $b^5$, leads upward from each pivot or plug $b^4$ into and through each arm $g$, $g'$, $g^2$, and $g^3$ (see Figs. 4 and 5) to the plug-valves $b$, $b'$, $b^2$, and $b^3$ at the outer ends of said arms. The ports or passages in the plug-valves $b$, $b'$, $b^2$, and $b^3$ lead downward and then turn horizontally to connect with the pipes $a$, $a'$, $e$, and $e'$. (See Figs. 5 and 7.) Tracing one line of connected passages through the center-fitting and its attached parts, it will be seen in Figs. 4, 5, and 7 that steam flowing to the right or rear through the pipe $e'$ enters through the port of the plug-valve $b^2$, and if the port in the latter stands in the right position, as shown, for example, in Fig. 2, flows thence through the passage in arm $g^2$ downward into one of the plugs $b^4$ through its port $b^5$, (shown in Figs. 6 and 8,) which connects with the passage $h^2$ in the center-fitting. The passage $h^2$ is continuous with the passage $h^3$, (see Fig. 6,) thus permitting steam to flow directly through the arm $g^2$ and through the arm $g^3$ into the pipe $e$ when the arm $g^3$ stands in the position which opens its port to the pipe $e$, as shown in Figs. 1 and 5. Thus there is established a direct steam-passage through the center-fitting for the supply of other cars to the rear.

Midway in the length of the passage $h^2\ h^3$, and directly over it, is a plug valve or cock, $y'$, Figs. 4, 5, and 9, with a port or passage leading from either side of it. This plug-valve may be turned in either of two positions, thus connecting it with the right-hand or the left-hand port $f^4$. (Shown in Figs. 4 and 5.) If turned to the left, this port establishes connection, through the passage shown in Fig. 5, with the pipe $c$, Figs. 4, 7, and 8, which is connected with the local heating device of the car. (See Fig. 1.) It will thus be seen that when the plug $y'$ is turned to the proper position steam passing through the supply-pipe $e'$, through the passage $h^2\ h^3$, can rise through the plug $y'$ and flow through the pipe $c$ into the heating device of the car, while at the same time if the arm $g^3$ is turned in the proper position, as in Fig. 5, a portion of the supply of steam may flow through the fitting and through this arm into the pipe $e$, and thus reach the other cars of the train. On the opposite side of the center-fitting is another plug valve or cock, $y$, similar to $y'$, just described, which is located similarly over another continuous port or passage, $h\ h'$, Figs. 5 and 6, identical in all respects with the continuous passage $h^2\ h^3$ (shown in Figs. 5, 6, and 8. If, therefore, steam be flowing through the line of pipes on the opposite side of the car, as at $a$ or $a'$, it may enter the passage $h\ h'$, flow upward through the key $y$, and thence into and out of the pipe $c$, Figs. 4, 7, and 8, in the same manner as steam received through the pipe $e'$, as previously described. It will thus be seen that either of the longitudinal pipes on each side of the car may be used at pleasure as the steam-supply line, and by adjusting the cocks $y\ y'$ in the proper positions the steam thus received may be admitted into the heating devices of the car through the pipe $c$. Whichever system is thus connected with the pipe $c$—as, for example at $y$, as shown in Fig. 5—the opposite key, as at $y'$, should of course be turned in the contrary direction, thus preventing the direct circulation of steam through both cocks.

In Figs. 4, 7, and 8, $d$ represents a pipe-connection similar to $c$, which is intended to be connected with the return or condensed-water pipe of the heating devices of the car, so that the water flowing therein will enter the center-fitting, pass thence into one of the ports or passages $f^4$, and thus reach the two cocks $y\ y'$. Only one of these being open (for the reason just above explained)—as, for example, $y'$, Fig. 5—the water of condensation will flow downward through the plug $y'$ into the passage $h^2\ h^3$, from which latter it may flow into the plug at one end of said passage, and thence either through the arm $g^2$ and plug-valve $b^2$ into the pipe $e'$ or, at the opposite end of the passage, through the arm $g^3$ and plug-valve $b^3$ into the pipe $e$.

It will thus be seen that I provide means in the center-fitting, as illustrated in Figs. 4, 5, 7, and 8, whereby with a locomotive on the right, and with the cocks $b$ and $b^3$ set as represented in Fig. 5, steam may be received through the pipe $a$ and pass upward through the plug or cock $y$ and pipe $c$ to the heating devices of the car, and whereby condensed water from the same may pass downward through the pipe $d$ and cock $y'$, and thus back to the locomotive through the longitudinal pipe $e$. In like manner, if the locomotive be placed to the left of the center-fitting with the arms $g'\ g^2$ as shown in Fig. 1, steam may be received through the pipe $a$, and the condensed water returned through the pipe $e$, or vice versa. Moreover, if the arms $g'\ g^2$ should stand approximately at right angles to the center-fitting, as do the similar arms, $g\ g^3$, in Fig. 5, a continuous passage would be established through the center-fitting on each side, serving on the one side to couple the pipe $a$ with the pipe $a'$ continuously, and on the other side to couple the pipe $e$ with the pipe $e'$ continuously. (See Fig. 1.) It will be seen that I have thus provided in the center-fitting for establishing throughout two continuous lines of flow—one for steam and the other for condense-water—and have provided also for connecting each of these lines of flow, the one with the steam-inlet pipe to the heating devices of the car and the other with the condense-water or return pipe from such devices. I have provided, moreover, for using either line of pipe for the steam-supply service and the opposite side for the return-water service by simply reversing the positions of the two plug-cocks $y$ and $y'$.

In order to arrest the flow of steam or water through the center-fitting of the rear car of a train, I construct the plug-valves $b^2\ b^3$ with a port or outlet so placed that when the arm carrying the plug stands approximately at a right angle to the center-fitting, as at $g^3$, Fig. 5, a passage is established through the plug into the arm, while when the arm is retracted to the position shown at $g^3$, Fig. 4, the port or outlet of the plug $b^3$ is closed, thus interrupting the passage between the plug and the arm. Fig. 5 therefore represents the center-fitting in the position which its several parts occupy when the car to which it is attached is coupled at the right-hand end to another car, the pipe $a$ serving as the steam-supply pipe and the pipe $e$ as the return or condense-water pipe, while, the arms $g'\ g^2$ being retracted, (the pipes $a'\ e'$ being disconnected from another car,) both passages are closed, and any flow of steam or water rearward or to the left through the center-fitting is arrested.

The retraction of the four vibrating arms on each center-fitting when the pipes attached to them are disconnected at either end from those of another car is accomplished by the action of the springs $f\ f$, Fig. 4, the tendency of which is continuously to force the arms $g$ $g^3$ backward in the position shown in Fig. 4 and to retain them there, thus closing all connection through the pipes attached to said arms. When the pipes $a$ and $e$, Fig. 4, are coupled to the corresponding pipes on another car, the arms are moved forward to the position indicated in Fig. 5, the springs $f\ f$ being proportionately compressed, and are held in approximately this position by the opposing pressure of the springs similar to those at $f\ f$, Fig. 4, on the center-fitting of the next car. Referring to pipe $a$, for example, in Fig. 4, this has a coiled spring, $f$, tending to force it to the left, and may be coupled at its other end to a similar pipe under the next car having a similar spring acting in a contrary direction. The two springs, being of equal force, neutralize each other, and thus hold both sets of arms approximately in the position shown by $g\ g^3$, Fig. 5, but at the same time permit such oscillation of the vibrating arms as may be necessary to compensate for expansion and contraction of the pipes and for changes in length due to the cars passing around curves, &c.

Referring to the several views of the center-fitting, it will be seen that the flow through each of the four lines of pipe connecting therewith may be cut off from the center-fitting, the point of interruption being the rotating plug-valve at the outer end of each vibrating arm. It is intended that each of these pipes shall be hung, as shown in Fig. 1, so as to incline away from the center-fitting, and to thus automatically drain itself by gravity whenever disconnected from the corresponding pipe on an adjoining car. In like manner the port or passage through the vibrating arm, as at $g^3$, Fig. 5, inclines toward the center-fitting, as shown by the sectional view, Fig. 10, so that the water of condensation therein will gravitate into the passage $h^2\ h^3$ of the center-fitting. This passage, as shown partly in section in Fig. 8, is also inclined to a central point and there connects with the transverse passage shown in dotted lines in Fig. 5 and in section by Fig. 9.

At the central point of the center-fitting in the transverse passage $i\ i'$, Figs. 5, 6, and 9, is a plug-cock operated by the stem M, and having at opposite sides two ports or openings, $z'$, Fig. 9, as shown in Figs. 6 and 9, which are closed, and which, when turned into coincidence with the transverse ports $i\ i'$, permit any water contained in the latter to drain out through the center cock and to discharge itself downward by gravity. Hence it follows that a car being disconnected from a locomotive and from other cars, each of the four lines of pipe which are united through the center-fitting will be automatically cut in two by the rotating plug-valve $b, b', b^2$, or $b^3$ in the outer end of each vibrating arm, and that all water contained in each of said pipes will thereupon discharge itself by gravity through the outer end of each pipe, while all water contained on the other side of said plug in the outer end of each vibrating arm will be discharged by gravity through the center-fitting and out of the drain-cock in the middle of the latter whenever this cock is opened for such purpose.

To provide for the convenient manipulation of the three cocks in the center-fitting, I extend their stems $M M' M^2$ upward, as shown in Fig. 9, into the valve-box shown by Figs. 11, 12, and 13. This box is intended to be let into the floor of a car so as to be flush therewith, and is covered with a hinged lid to exclude dirt. Each of the three valve-stems has attached to its upper end an indicator, $N N' N^2$, to show the position of the valve. The valves, as shown in Fig. 11, are operated by means of a wrench or handle shown in Figs. 14 and 15, which has a socket, as usual, fitting onto the valve-stems. This socket has lugs or projections S S, the purpose of which is to pass under the plate P, Figs. 11 and 13, so as to prevent the removal of the wrench except when the indicators stand in one of their two opposite positions, thus insuring that the valves shall not be left in any intermediate position, but shall always be either wide open or entirely closed. It is intended that suitable lettering shall be stamped or otherwise affixed to the plate P, indicating the positions which the indicators $N' N^2$ should occupy relatively to the front end of the car when coupled in a train. Preferably these indicators will be so attached that each should always point toward the locomotive, thus affording an easy indication of the proper setting of the valves. The indicator N shows the position of the small drain-cock at the center of the fitting, which position should be indicated by the words "Open" and "Closed" stamped on either side of the plate P. The wrench shown in Fig. 4 may be kept within the valve-box when not in use, a place being provided therefor, as seen in Figs. 11 and 13, by forming two notches, R R, in ribs within the box. In the use of my apparatus, therefore, all that is required to be done by the brakeman or other attendant when the car is coupled in a train is to open the valve-box in the floor and see whether or not the pointers $N' N^2$ are turned toward the locomotive, and, if not, to turn them in that position, and at the same time to see that the drain-cock is in the closed position.

When the car is uncoupled from a train no attention is needed, except in cold weather to turn the indicator N into the open position, in order that the water of condensation contained in the center-fitting may thereby be discharged. Should this drain-cock be inadvertently left open when the car is coupled in a train, the fact will at once manifest itself by the escape of steam from the bottom of the center-fitting. When desired, such escape may be permitted for a short time as a means of "blowing through" the system, and thereby discharging the water of condensation resulting from the heating up of the system when cold, after which the drain-cock should be closed. It is intended that in practice, of course, all of the pipes and fittings which are outside of the car will, as usual, be protected against freezing by suitable non-conducting coverings of any of the well-known kinds.

Referring again to Figs. 1 and 2, it will be seen that the two parallel pipes $a\ a'\ e\ e'$, extending from the center-fitting to each end of the car, are coupled near their extremities by a yoke or cross-head, $m$, by means of collars $l\ l$, fastened to the pipes $a\ e$. The coupling of the other two pipes is in practice the same, and so is not especially illustrated. Passing through this cross-head is a rod, $n$, having at its rear end a nut and washer, $n'\ n^2$, serving as an abutment for one end of the coil-spring $o$, which at its opposite end presses against the yoke $m$. The other end of the rod is connected to a bell-crank, $p$, connected by the link $q$ to a smaller bell-crank, $r$, Fig. 3, which in turn is coupled by the link $s$ to the short arm $t'$ of another bell-crank pivoted on the upper surface of the car-platform, the other end of this bell-crank being lengthened into the handle $t$. As seen in Fig. 3, the small bell-crank on top of the platform is so arranged that in one position its short arm passes slightly beyond the center or neutral point and is thus locked, while by reversing its other arm or handle, $t$, the link $s$ is caused to drop, thereby releasing the longer link, $q$, Fig. 2, and permitting the spring $o$ to be released. Whenever it is desired to couple the pipes $a\ e$, Fig. 2, with the corresponding pipes of an adjoining car, the handle $t$ on the platform is moved into position, as shown in Fig. 3, thus compressing the spring $o$, Fig. 2, and tending to pull forward the pipes $a\ e$ by reason of the superior force of the spring $o$ as compared with the combined force of the two smaller and less-powerful springs $f\ f$, Fig. 4, attached to the other end of the pipes at the center-fitting. In like manner the corresponding pipes on any adjoining car are also drawn forward and thus made ready for coupling. The purpose of the spring $o$ on each car is to enable the longitudinal pipes to be held forward by elastic pressure for the purpose of coupling, and yet left free within reasonable limits to play back and forth under the varying relative positions of the two cars. I do not in this connection illustrate any particular method of coupling the pipes between the cars, although I prefer to use a rigid coupling or connection at the junction of each pipe with the corresponding pipe of the next car and to provide universal or swivel joints $j\ j$, as shown in Figs. 2 and 16, to provide for the swinging and oscillation of the pipes by the varying motions of their respective cars.

It will be seen that the operation of my apparatus contemplates the formation of a closed circuit throughout the length of the train, consisting of two parallel lines of pipe, one being utilized for the flow of steam outward and the other for the return of the water of condensation, the system forming at all times a closed circuit that, by means of the center-fitting, I provide for the accomplishment of the foregoing, and simultaneously for forming a proper connection between the pipe which for the time being constitutes the steam-main of the train and the steam-supply pipe of the local heating system on each car, and forming in like manner a connection through the center-fitting between the return or condense-water pipe of the local system on each car and the line of pipes forming the condense-water return-main throughout the train; that as a result of this I am able to secure the return to the locomotive of all water of condensation, thus avoiding leakage or dripping at any point and enabling the return-water to be collected in a suitable tank on the engine or its tender and again utilized in the boiler; that I provide for the automatic closure of the circuit at the rear side of the center-fitting of any car which may happen to form the last of a train, and provide, also, for the automatic drainage of the longitudinal pipes of one car whenever it is disconnected from another and for the entire drainage of the passages and valves contained in the center-fitting by the opening of a single drain-cock; that I also provide for the convenient use and rapid adjustment of the reversing-valves of the center-fitting to their proper positions and for indicating their positions at all times, and that I thereby enable a car to be coupled with the locomotive either end foremost, and yet to always have proper connection established between the longitudinal pipes and the local heating system of the car, and, finally, that I provide sufficient and convenient means for quickly coupling the parallel pipes under the car with those on the next car of a train, and make suitable provision for all changes in length or position of these pipes due either to expansion or to the varying motions of the cars relatively to each other.

Referring again to Fig. 10, it will be seen that a small hole, $h^4$, is drilled through the caps forming the under sides of the vibrating plugs carrying the arms $g\ g^3$, so that any water of condensation escaping past the packings of these plugs into the cavities between their ends and the caps will discharge itself. Similar holes may be made in all the corresponding caps. All other parts of the cocks and passages in the center-fitting are so arranged as to drain by gravity toward the center-fitting and to there discharge through the drain-cock, as shown in Fig. 9.

I have shown the center-fitting provided with two reversing-valves—one connected with each of the longitudinal lines of pipes—instead of a single reversing-valve provided with double ports according to well-known methods, whereby the connections with both lines of pipes would be controlled by a single valve. This is because there are practical reasons for preferring the use of two valves, and I propose connecting the stems of these valves by gear-wheels, as is common, so that a wrench or handle applied to one of them or to an idle-wheel between them would actuate both valves simultaneously, as indicated in Fig. 17. The function of the center-fitting, however, is not dependent upon whether the reversing-valves are one, two, or more in number, and I do not claim any particular number of valves in combination with such fitting.

I am aware that it is not broadly new to provide for the coupling of steam-pipes at the contiguous ends of two adjoining cars and for automatically preventing the steam admitted into pipes at one end of a car from passing out at the other end when the car in question forms the last of a train.

What I claim to be new, and desire to secure by Letters Patent of the United States, is—

1. In a car-heating apparatus, the combination of four longitudinally-movable pipes extending two from each end toward the center of a car, an intermediate center-fitting, four hollow arms pivotally connecting said four pipes and center-fitting, and local heating-pipes connected with the center-fitting and through it with the said four pipes, the center-fitting being provided with passages through it, so that a heating fluid may be admitted into the local heating-pipes and also pass on for heating another car, substantially as set forth.

2. The combination, with a car, of four pipes connected with local heating-pipes and extending two from each end toward the center of the car, and an intermediate center-fitting with which the four pipes have a movable jointed connection, and springs acting on said pipes to move them lengthwise, the center-fitting having passages communicating with said pipes for a heating medium, substantially as set forth.

3. In a car-heating apparatus, a center-fitting containing two parallel longitudinal ports, $h\ h'$ and $h^2\ h^3$, and two transverse ports, $f^4\ f^4$, connected together, these ports being provided with valves for opening and closing them, in combination with the pivotal hollow arms $g\ g'\ g^2\ g^3$, substantially as set forth.

4. A center-fitting or distributing-chamber with two parallel longitudinal ports and two parallel transverse ports, each of the latter having a separate outlet or connection leading to the car, each transverse port being connected with one or the other of the longitudinal ports by a reversing-valve, whereby either of said outlets or connections leading to the car may be connected at will with either of said longitudinal ports.

5. A center-fitting or distributing-chamber having two longitudinal and two transverse ports and provided also with four vibrating arms, the passages or ports contained in each of said arms connecting, as described, with the longitudinal ports in the center-fitting, so that any fluid contained in any of said arms will tend to discharge itself by gravity into said longitudinal ports and thence to a common drip or drain cock.

6. A center-fitting or distributing-chamber having four vibrating arms, each of which is provided at one end with a plug or cock for opening and closing the passages into the center-fitting by the vibration of the arms, substantially as set forth.

7. A center-fitting or distributing-chamber with four vibrating hollow arms, each having at the highest point of its internal port or passage an automatic cut-off, substantially as set forth.

8. A center-fitting or distributing-chamber having one or more vibrating arms, and at each end of each of said arms a rotating plug, substantially as set forth.

9. A center-fitting or distributing-chamber having one or more vibrating arms, one end of each arm being pivoted to the center-fitting and the other connected pivotally to a longitudinal pipe, substantially as set forth.

10. A center-fitting or distributing-chamber fixed to the body of a car and having four vibrating arms and one or more reversing-valves for controlling the direction of flow through said center-fitting, substantially as described.

11. A center-fitting or distributing-chamber fixed to the body of a car, and having four vibrating arms, two longitudinal and two transverse ports, and provided also with a drip or drain cock located centrally, substantially as set forth.

12. A center-fitting or distributing-chamber fixed to the body of a car, and having four vibrating arms, two longitudinal and two transverse ports, one or more reversing-valves, and a drip-valve, substantially as set forth.

13. In a car-heating apparatus, the combination, with a center-fitting or distributing-chamber, of a hollow vibrating arm and a pipe connecting therewith and a spring acting on said pipe to vibrate said arm, substantially as set forth.

14. In a car-heating apparatus, the combination of a center-fitting, a pipe leading thereto, and a vibrating hollow arm pivotally connecting the center-fitting with the pipe, the pipe being supported so as to slide longitudinally with the vibrations of the arm, substantially as set forth.

15. In a car-heating apparatus, the combination of two parallel pipes, a center-fitting connected to the pipes by vibrating arms, and a coupling device for the pipes by which they are moved endwise, substantially as set forth.

16. In a car-heating apparatus, a series of longitudinal pipes extending throughout the train and rigidly connected together endwise, in combination with vibrating arms and center-fitting, substantially as set forth.

17. The combination, with a car, of a local heater, B, a local system of circulating-pipes, B', pipes $c$ and $d$, connecting the local heater and the center-fitting, the center-fitting X, and the longitudinal pipes $a$ $e$, the center-fitting having valve mechanism and passages for providing communication between said pipes, so that steam may be admitted to the local heater for local circulation, substantially as set forth.

18. A center-fitting, X, provided with the hollow pivoted arms $q, q', q^2$, and $q^3$, the valves $b$ $b'$ $b^2$ $b^3$, passages $h$ $h'$ $h^2$ $h^3$, valves $y$ and $y'$, passages $i$ $i'$, and cock $z$, substantially as set forth.

19. The combination, with the center-fitting X, provided with the valves and passages, as described, of the pipes $c$ and $d$, draining to the center-fitting, and pipes $a$, $e$, $a'$, and $e'$, draining from the center-fitting to the opposite ends of a car, substantially as set forth.

20. The combination, with the pipes $a$ and $e$, of the springs $f$, spring $o$, the rod $n$, and yoke $m$, with the hand-lever $t$, and the connecting bell-crank levers and rods between it and the rod $n$, substantially as set forth.

In testimony whereof I have hereunto subscribed my name.

HENRY R. TOWNE.

Witnesses:
GEO. E. WHITE,
E. W. RIKER.